United States Patent
Shi et al.

(10) Patent No.: US 10,731,088 B2
(45) Date of Patent: Aug. 4, 2020

(54) OXIDATION CATALYST AND PROCESSES FOR USING SAME

(71) Applicant: UOP LLC, Des Plaines, IL (US)

(72) Inventors: Yili Shi, Buffalo Grove, IL (US); Neil Thomas, Ann Arbor, MI (US)

(73) Assignee: UOP LLC, Des Plaines, IL (US)

(*) Notice: Subject to any disclaimer, the term of this patent is extended or adjusted under 35 U.S.C. 154(b) by 269 days.

(21) Appl. No.: 15/868,965

(22) Filed: Jan. 11, 2018

(65) Prior Publication Data

US 2018/0134969 A1   May 17, 2018

Related U.S. Application Data

(63) Continuation of application No. PCT/US2016/041144, filed on Jul. 6, 2016.
(Continued)

(51) Int. Cl.
*C10G 29/20* (2006.01)
*C10G 27/00* (2006.01)
(Continued)

(52) U.S. Cl.
CPC .......... *C10G 29/20* (2013.01); *B01J 31/0202* (2013.01); *B01J 31/0208* (2013.01); *B01J 31/0217* (2013.01); *B01J 31/0244* (2013.01); *B01J 31/0271* (2013.01); *B01J 31/18* (2013.01); *B01J 31/183* (2013.01); *B01J 31/22* (2013.01);
(Continued)

(58) Field of Classification Search
CPC ........ C10G 29/20; C10G 27/00; C10G 29/22; C10G 29/28; C10G 2300/202; B01J 31/22; B01J 31/18; B01J 31/0244; B01J 31/0217; B01J 31/0202; B01J 31/0208; B01J 31/0271; B01J 31/183; B01J 2231/70

See application file for complete search history.

(56) References Cited

U.S. PATENT DOCUMENTS 2,701,784 A    2/1955 Cauley
2,853,432 A    9/1958 Gleim et al.
(Continued)

FOREIGN PATENT DOCUMENTS

CN    103911177 A    7/2014
GB    758848 A    10/1956
(Continued)

OTHER PUBLICATIONS

Search Report dated Nov. 17, 2016 for corresponding PCT Appl. No. PCT/US2016/041144.

*Primary Examiner* — Randy Boyer
*Assistant Examiner* — Juan C Valencia

(57) ABSTRACT

A catalytic composition and process for using same. The catalyst may be utilized for an oxidation reaction, for example, for the conversion of mercaptans to disulfides. The catalyst includes a metal component, for example, cobalt phthalocyanine structure. The organic component may comprise any number of different oxidation promoters that are capable of promoting the reduction of oxygen, preferably in a caustic, environment. The organic component may comprise an unsaturated six member ring having at least five carbon atoms, and wherein the sixth member of the six member ring is either C or N, and in which at least two substituent groups are present on the six membered ring.

11 Claims, 1 Drawing Sheet

Related U.S. Application Data

(60) Provisional application No. 62/192,818, filed on Jul. 15, 2015.

(51) Int. Cl.
  *B01J 31/22* (2006.01)
  *B01J 31/18* (2006.01)
  *B01J 31/02* (2006.01)
  *C10G 29/22* (2006.01)
  *C10G 29/28* (2006.01)

(52) U.S. Cl.
  CPC .............. *C10G 27/00* (2013.01); *C10G 29/22* (2013.01); *C10G 29/28* (2013.01); *B01J 2231/70* (2013.01); *C10G 2300/202* (2013.01)

(56) References Cited

U.S. PATENT DOCUMENTS

| | | |
|---|---|---|
| 3,923,645 A | 12/1975 | Anderson et al. |
| 3,978,137 A * | 8/1976 | Frame .................. B01J 31/183 423/576.6 |
| 3,980,582 A | 9/1976 | Anderson et al. |
| 4,049,572 A | 9/1977 | Douglas |
| 4,090,954 A | 5/1978 | Ward |
| 4,705,620 A * | 11/1987 | Bricker .................. C10G 19/08 208/206 |
| 4,923,596 A | 5/1990 | Bricker et al. |
| 4,956,324 A | 9/1990 | Pollastrini et al. |
| 4,968,411 A * | 11/1990 | Dowd .................... B01J 31/183 208/206 |
| 5,470,486 A | 11/1995 | Gillespie |
| 5,849,656 A | 12/1998 | Mazgarov et al. |
| 7,244,352 B2 | 7/2007 | Halbert et al. |
| 2011/0163008 A1 * | 7/2011 | Zhang .................... C10G 17/00 208/204 |
| 2014/0202963 A1 | 7/2014 | Laricchia et al. |

FOREIGN PATENT DOCUMENTS

| | | |
|---|---|---|
| RU | 1734274 A1 | 8/2001 |
| RU | 2230096 C1 | 6/2004 |
| WO | 2007030229 A2 | 3/2007 |

* cited by examiner

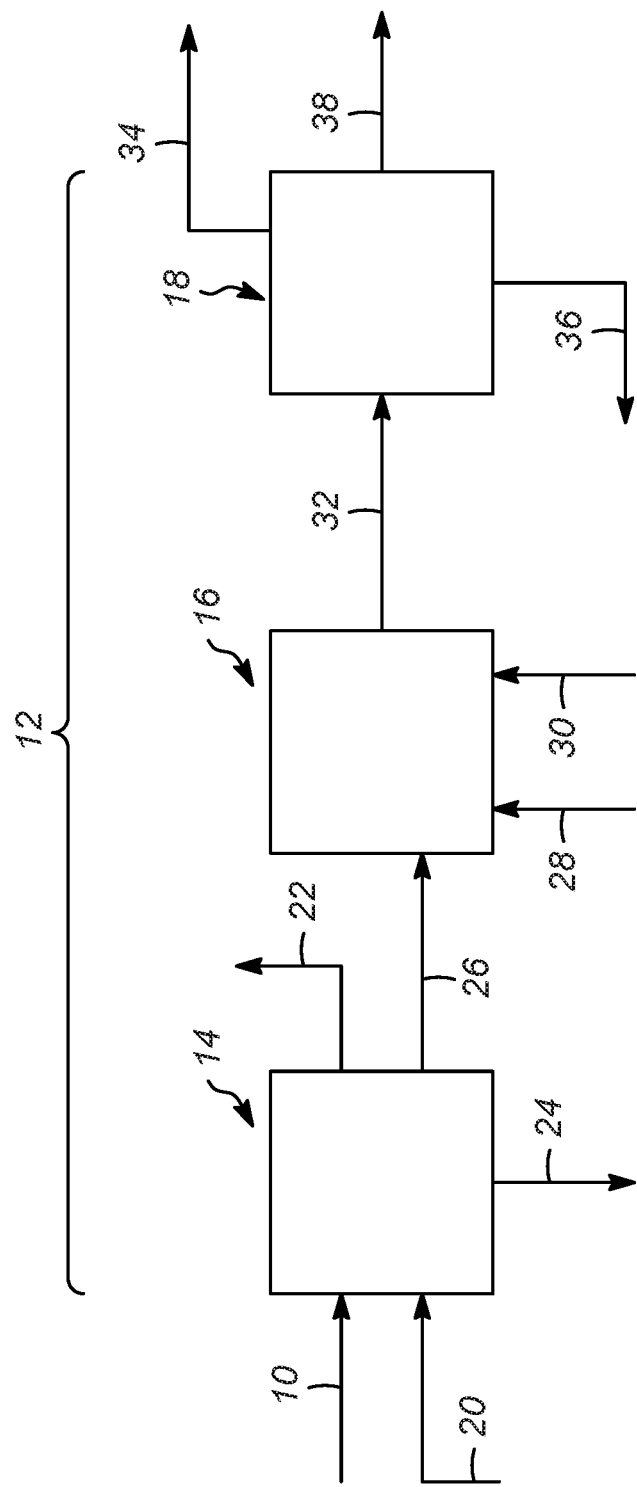

OXIDATION CATALYST AND PROCESSES FOR USING SAME

CROSS-REFERENCE TO RELATED APPLICATIONS

This application is a Continuation of International Application No. PCT/US2016/041144 filed Jul. 6, 2016 which application claims benefit of U.S. Provisional Application No. 62/192,818 filed Jul. 15, 2015, the contents of which cited applications are hereby incorporated by reference in their entirety.

FIELD OF THE INVENTION

This invention relates generally to a catalyst for oxidation, and more particularly to a catalyst for oxidizing mercaptans to disulfides. Specifically, the invention relates to a catalyst and processes of using the catalyst for the conversion of mercaptans in an aqueous alkaline stream that have removed from a hydrocarbon stream.

BACKGROUND OF THE INVENTION

Petroleum refining and petrochemical processes frequently involve treating processes for removing sulfur compounds from hydrocarbon streams. In these processes, mercaptans present in a liquid hydrocarbon stream such as naphtha or LPG are extracted into an aqueous alkaline solution. The extracted mercaptans may be oxidized to disulfide compounds.

The sweetening process requires an oxygen supply stream, typically air, to supply the required oxygen. An admixture of hydrocarbon and an oxidation catalyst in an aqueous alkaline environment can be passed to an oxidation vessel to be contacted with air. The oxidation catalyst may be impregnated on a solid composite or may be dispersed or dissolved in the aqueous alkaline solution. A commonly employed oxidation catalyst comprises a metal phthalocyanine compound, which may be dissolved in an alkaline solution or may be impregnated on activated charcoal. Suitable catalysts are described in U.S. Pat. Nos. 2,853,432; 4,049,572 and 4,923,596.

The reaction rate (activity) of the catalyst in the extractive processes is an important factor for efficient removal of mercaptans from hydrocarbon streams. If higher catalyst activity could be achieved then less catalyst could be used or greater amounts of hydrocarbon could be processed, ultimately resulting in economic advantages or improved process efficiency.

Accordingly, there is a constant desire for improved catalysts for converting mercaptans to disulfides.

SUMMARY OF THE INVENTION

A new catalyst composition has been invented. The catalyst composition may be used, for example, to convert mercaptans to disulfides by oxidation. The catalyst may be used in other suitable oxidation reactions including, for example, oxidation of hydrogen sulfide in caustic.

In a first embodiment of the invention, the present invention may be characterized broadly as providing a catalytic composition comprising: a metal component comprising a metal bonded to at least two nitrogen atoms; and, an organic component comprising a six member ring having at least five carbon atoms, and wherein the sixth member of the six member ring is either C or N. At least two substituent groups for the six member ring are each independently selected from hydroxyl, amino, amides, carbonyl, carboxyl, thiol, sulfonate, and pyridine, or form a fused ring.

In at least one embodiment, the sixth member of the six member ring of the organic component is C and the at least two substituent groups form a six member fused ring.

In at least one embodiment, the sixth member of the six member ring of the organic component is C and the at least two substituent groups form a five member fused ring.

In at least one embodiment, the five member fused ring includes N and a third substituent group of the six member ring of the organic component comprises sulfonate.

In one or more embodiments, the sixth member of the six member ring of the organic component is N. It is contemplated that a first of the at least two substituent groups is pyridine and wherein the second of the at least two substituent groups is bonded to the N in the six member ring of the organic component.

In one or more embodiments, the sixth member of the six member ring of the organic component is C and the six member ring includes at least one hydroxyl group. It is contemplated that the six member ring includes at least two hydroxyl groups. It further contemplated that the six member ring includes at least one amine group. It is also contemplated that the six member ring includes at least one thiol group.

In at least one embodiment, the sixth member of the six member ring of the organic component is C and wherein the six member ring includes at least two amine groups.

In one or more embodiments, the sixth member of the six member ring of the organic component is C and the six member ring includes at least three hydroxyl groups. It is contemplated that a fourth substituent group of the sixth member ring comprises a carboxyl group. It is also contemplated that a fourth substituent group comprises an ester group.

In one or more embodiments, at least one additional substituent group on the six member ring of the organic component comprises a halogen. It is contemplated that the at least two substituent groups are hydroxyl groups. It is further contemplated that at least three substituent groups on the six member ring of the organic component are hydroxyl groups.

In at least one embodiment, the catalytic composition is aqueous.

In at least one embodiment, the metal component comprises a metal bonded to at least four nitrogen atoms.

In at least one embodiment, the metal is cobalt.

In at least one embodiment, the sixth member of the six member ring of the organic component is C and wherein the at least two substituent groups form a five member fused ring.

In a second aspect, the present invention may be generally characterized as providing a process for oxidizing a compound by: contacting the compound with an oxidation catalyst; and, oxidizing the compound in the presence of the catalyst. The oxidation catalyst may be any of the catalysts described herein.

In some embodiments, the process may include contacting the compound, and the catalyst, with an oxidation gas.

In a third aspect, the present invention may be broadly characterized as providing a process for removing mercaptans from a hydrocarbon stream by: extracting mercaptans from a hydrocarbon stream with a caustic stream to provide a rich caustic stream; oxidizing the mercaptans in the rich caustic stream with an oxidation gas, in the presence of a catalyst, to produce disulfides. The oxidation catalyst may be any of the catalysts described herein.

In at least one embodiment, the process includes separating a disulfide phase from a lean caustic phase.

In at least one embodiment, the catalyst comprises a metal component and an organic component. The metal component may include a metal bonded to at least two nitrogen atoms. The metal component may comprise a water soluble cobalt phthalocyanine, cobalt phthalocyanine disulfonate, cobalt phthalocyanine sulfonamide, a B12 vitamer, such as cobalamin, cobalt porphyrins, cobalt porphines, and cobalt tetra-aza macrocycles. The organic component may comprise a bipyridinium core structure, such as a viologen core structure, a benzene with two or more amines, hydroxyl, sulfonane groups, a indigo core structure, such as indigo carmine, benezenetriols, and substituted benzenetriols, which may include, a sulfate, an ester, and ether, and carboxyl, and the like, and phenolic acids, such as di- and trihydroxyl phenolic acids, and substituted variants of same (such as esters, amides, ethers). It is contemplated that the organic component is halogenated.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing FIGURE, in which:

The FIGURE shows an exemplary process flow diagram according to at least one embodiment of the present case.

DETAILED DESCRIPTION OF THE INVENTION

As mentioned above, a new catalytic composition has been invented. Currently, the catalyst utilized for the conversion of mercaptans to disulfides include a metal component, for example, cobalt phthalocyanine structure. The various embodiments described herein enhance the catalytic activity of a metal component by addition of a water-soluble organic co-catalyst to promote oxygen reduction.

By themselves, the second, organic components are generally unstable and will decompose rapidly in the absence of mercaptans, making them commercially undesirable as a catalyst. Furthermore, alone, the second, organic components are ineffective at catalyzing the desired reaction. However, in conjunction with the metal component, the second, organic components have provided surprising and unexpected increase in the activity of the catalytic composition. For example, in a 1:1 weight ratio of metal component to organic component was found to reduce the overall catalyst demand by 50%. Overall, this results in the lower catalyst turnover and improved catalyst activity.

With these general principles in mind, one or more embodiments of the present invention will be described with the understanding that the following description is not intended to be limiting.

In one aspect of the present invention, the present invention is directed to a catalytic composition comprising a metal component and an organic component. A molar ratio of metal component to organic component may be between 100:1 to 10:90, depending, at least in part, about the activity of the organic component. The catalytic composition may be liquid with one or more of the components present as dissolved or suspended particles. The liquid may be aqueous, or may comprise an alcohol solution, or a combination thereof. Alternatively, the catalyst composition could be formed in situ by mixing solutions or streams of the two components.

The metal component comprises, generally, a metal bonded to at least two nitrogen atoms. Preferably, the metal component comprises a metal bonded to at least four nitrogen atoms. In a preferred embodiment, the metal comprises cobalt, however it is believed that other metals, such as nickel or copper may be used. An exemplary metal component comprises a sulfonated metal phthalocyanine such as cobalt phthalocyanine disulfonate and cobalt phthalocyanine sulfonamide. A cobalt phthalocyanine may be prepared by the method of U.S. Pat. No. 4,049,572 B1, the teachings of which are herein incorporated by reference. Other metal components that are believed to be useful in the present application are described in U.S. Pat. Nos. 4,956,324, 3,923, 645, 3,980,582, and 4,090,954. These are merely exemplary metal component, and others may be utilized in accordance with the present invention including, for example B12 vitamers, B12-like compounds, cobalt porphyrins, cobalt porphines, cobalt tetra-aza macrocycles, and the like.

The organic component may comprise any number of different oxidation promoters that are capable of promoting the reduction of oxygen, preferably in a caustic, environment. Preferably, the organic component comprises an unsaturated six member ring having at least five carbon atoms, and wherein the sixth member of the six member ring is either C or N. Most preferably, at least two substituent groups for the six member ring are each independently selected from a hydroxyl group, an amino group, a carbonyl group, a carboxyl group, a thiol group, a sulfonate group, and a pyridine ring, or form a fused ring, provided that if one substituent group is a pyridine ring, the other substituent group is an alkyl group.

For example, the sixth member of the six member ring of the organic component may comprise C, such that the ring is a benzene ring and the at least two substituent groups form a six member fused ring. A preferred example of such an organic component comprises 2-hydroxy-1,4-naphthoquinone, depicted below:

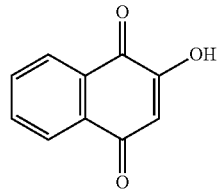 [SMILES: O=C1C=C(O)C(=O)c2ccccc21]

In another example, the sixth member of the six member ring of the organic component is C forming benzene and the two substituent groups form a five member fused ring. It is preferred that the five member fused ring includes N. For example, the organic component may comprise indigo white or indigo, depicted below:

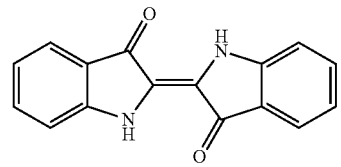 [SMILES: O=C1/C(=C2\Nc3ccccc3C2=O)Nc2ccccc21]

It is most preferred that a third substituent group of the six member ring of the organic component comprises sulfonate. An exemplary component comprises indigo carmine, depicted below:

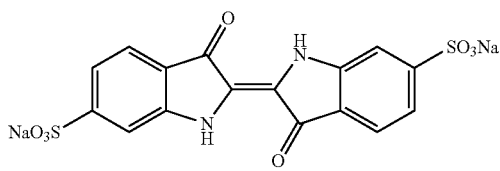

Other substitutions and variations may also be utilized.

Various organic components are based upon a substituted benzene ring, such as depicted below:

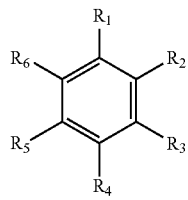

At least one substituent group of the benzene ring (i.e., that is at least one of R1, R2, R3, R4, R5, R6) comprises a hydroxyl group (—OH). Additionally it is contemplated that, two substituent groups comprise hydroxyl groups, and further contemplated that three or more substituent groups comprise hydroxyl groups. For example the organic component may comprise benzenehexol.

It is also contemplated that at least one substituent group of the benzene ring comprises at least one amine group (—NH$_2$). This may be in addition to one or more hydroxyl groups. It is specifically contemplated that two or more amine groups are present.

It is further contemplated that at least one substituent group of the benzene ring comprises at least one thiol group (—SH). This may be in addition to one or more hydroxyl groups, one or more amine groups, or both.

In various embodiments, at least one substituent group of the benzene ring comprises a carboxyl group (—COOH), an ester group (—RCOOR'), or an amide group (R(O)NH$_2$). Preferably, the carboxyl, ester or amide are utilized in a di- or a tri-substituted benzene ring (i.e., a benzene ring having two or three substituent groups already). For example, trihydroxybenzoic acids such as gallic acid, as well as esters, amides, methyl ethers, and other variants of same may be used. Additionally, it is believed that dihydroxybenzoic acids, as well as esters, amides, methyl ethers, and other variants of same may be used.

It is believed to be particularly advantageous that at least one additional substituent group on the six member ring of the organic component comprises a halogen. This is believed to stabilize the organic compound. Most preferably, the halogenated compound comprises a di- or a tri-substituted benzene ring.

In some embodiments of the present invention, the sixth member of the six member ring of the organic component comprises N (forming a pyridine ring). Preferred classes of such compounds comprise bipyridiums. In such compounds, the first substituent group comprises a pyridine (which may include one or more substituent groups). The second of the two substituent groups of the six member ring of the organic component is preferably bonded to the N in the six member ring of the organic component and most preferably comprises an alkyl group having for example between one to 15 carbon atoms. For example, one such compound that may be utilized comprises 1,1'-dimethyl-4,4'-bipyridinium dichloride, depicted below:

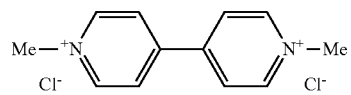 [SMILES: C[n+]1ccc(-c2cc[n+](C)cc2)cc1 ; [Cl-] ; [Cl-]]

It is believed that other suitable or acceptable oxidation promoters may be utilized beyond those discussed above. Moreover, the identification of one or more specific compounds is intended to be exemplary in nature and is not intended to be limiting in any manner.

The catalyst compositions of the present invention are believed to derive utility in the use of oxidation reactions for example to oxidize mercaptans or to oxidize hydrogen sulfide. Therefore, in one aspect of the present invention, the present invention is directed to a process for oxidizing a compound. The process may include contacting the compound with an oxidation catalyst, as well as an oxidation gas, and, oxidizing the compound in the presence of the catalyst. The oxidation catalyst may include the metal and organic components discussed herein. Accordingly, the above disclosure in regards to the various components is expressly incorporated herein by reference.

In one particularly useful application, the oxidation reaction may comprise converting mercaptans into disulfides, for example, in a hydrocarbon stream. An exemplary process for same will be described in relation to the FIGURE, with the understanding the following discussion is merely exemplary.

As shown in the FIGURE, a hydrocarbon stream 10 is passed to a sweeting zone 12 having an extraction zone 14, an oxidation zone 16, and a separation zone 18. The hydrocarbon stream 10 is typically in a liquid phase and can include a fuel gas stream, a liquefied petroleum gas, or a naphtha hydrocarbon. Often, the hydrocarbon stream 10 also comprises sulfur compounds in the form of one or more mercaptans and/or hydrogen sulfide. A hydrocarbon stream 10 can be an effluent from another refinery unit, e.g., an amine absorber. The hydrocarbon stream 10 can include hydrogen sulfide and one or more C2 to C8 hydrocarbons. Usually, the hydrocarbon stream 10 can include up to about 100 ppm, by weight, hydrogen sulfide.

In the extraction zone 14, the hydrocarbon stream 10 may be combined with a caustic stream 20 for removing sulfur compounds. The caustic stream 20 may comprise any alkaline material, and generally includes caustic soda (NaOH) and caustic alcohol (C$_2$H$_3$ONa). A water stream (not shown) may also be passed into the extraction zone 14.

A hydrocarbon product stream 22 mostly free of mercaptans can be withdrawn from the extraction zone 14. Additionally, a spent caustic stream 24 may be also withdrawn. A rich caustic stream 26 including mercaptans is withdrawn from the extraction zone 14 and is to be treated to remove the mercaptans. Accordingly, the rich caustic stream 26, an oxidation gas stream 28, typically air, and an oxidation catalyst 30 may be passed to the oxidation zone 16. The oxidation catalyst 30 may include the metal and organic components discussed herein. Accordingly, the above disclosure in regards to the various components is expressly incorporated herein by reference. Notwithstanding same, the oxidation catalyst 30 may comprise cobalt phthalocyanine disulfonate and 1, 2, 4 benzenetriol, or a B12 vitamer and cobalt phthalocyanine sulfonamide. Again these are merely exemplary.

In the oxidation zone 16, the mercaptides catalytically react with oxygen to produce caustic and organic disulfides. The oxidation zone 16 may include packing elements (not shown) to increase the contact between the vapor and liquid phases. An oxidized effluent 32, comprising a gas phase, a liquid disulfide phase, and a liquid aqueous caustic phase may be passed from the oxidation zone 16 to the separation zone 18.

In the separation zone 18, the various phases of the oxidized effluent 32 may be separated into a gas stream 34 which can be used as a fuel in a heater or furnace (with or without being blended with fuel gas). Additionally, a lean caustic stream 36 may be removed and recycled back to the extraction zone 14 as the caustic stream 20. A liquid disulfide phase 38 may also be removed and disposed of or processed further as is known in the art.

In such processes, the various catalytic compounds are believed to have improved activity as well as reaction rates. Moreover, for some of the promoters it was unexpectedly discovered that by utilizing the two components, the catalyst and the promoter, the total concentration required for such a use is less than the concentration required when only the catalyst component is used. Thus, not only is the reaction improved, but the catalyst concentration required to perform the reactions is significantly less.

In order to demonstrate the principles of the present invention various compositions were utilized in a caustic stream comprising mercaptans. More specifically, a feed with 13 wt % caustic and 1 wt % sulfur of mercaptans (1:1 molar ratio of methyl and ethyl) was charged to a stirred reactor and heated to about 33° C. (91° F.). Nitrogen gas was used to remove dissolved oxygen from the feed. A solution of the metal component of the composition was added to the reactor and then a solution of the organic component was added to the reactor. The reactor was pressurized to about 345 kPag (50 psig) with flowing air and was rapidly stirred. Periodic samples were removed from the reactor to measure mercaptan consumption and time to reach complete oxidation.

The components of the various compositions and the times to achieve complete oxidation of the caustic stream are shown in the below TABLE 1.

TABLE 1

| Metal Component (weight parts per million loading) | Organic Component (weight parts per million loading) | Time to Reach Complete Oxidation |
|---|---|---|
| cobalt phthalocyanine tetrasulfonate (100 wppm) | none | 12 minutes |
| cobalt phthalocyanine tetrasulfonate (50 wppm) | none | 20 minutes |
| cobalt phthalocyanine tetrasulfonate (50 wppm) | 1,2,4-benzenetriol (10 wppm) | 10 minutes |
| none | 1,2,4-benzenetriol (1000 wppm) | Did not reach complete oxidation in testing time frame |
| cobalt phthalocyanine tetrasulfonate (50 wppm) | 4-mercaptophenol (50 wppm) | 11 minutes |
| none | 4-mercaptophenol (500 wppm) | Did not reach complete oxidation in testing time frame |
| cobalt phthalocyanine tetrasulfonate (25 wppm) | 1,1'-dimethyl-4,4'-bipyridinium dichloride (25 wppm) | 17 minutes |
| cobalt phthalocyanine tetrasulfonate (50 wppm) | 2-hydroxy-1,4-naphthoquinone (200 wppm) | 13 minutes |

As can be appreciated based upon the foregoing data, the various catalytic compositions described above provide for an improved oxidation reaction by both increasing the rate of the oxidation reaction as well as increasing the catalyst activity. For example, in one instance, 50 wppm of cobalt phthalocyanine tetrasulfonate had a 20 minute time, while 25 wppm of cobalt phthalocyanine tetrasulfonate along with 25 wppm of a promoter, 1,1'-dimethyl-4,4'-bipyridinium dichloride, had a 17 minute time. Similarly, 50 wppm of cobalt phthalocyanine tetrasulfonate with 10 wppm of 1,2, 4-benzenetriol (10 wppm) had a time of 10 minutes. Thus, not only do the organic promoters increase the speed of the reaction, some of the reaction promoters do so with unexpected results, such as requiring only half of the amount of metal component.

Specific Embodiments

While the following is described in conjunction with specific embodiments, it will be understood that this description is intended to illustrate and not limit the scope of the preceding description and the appended claims.

A first embodiment of the invention is a composition comprising a metal component comprising a metal bonded to at least two nitrogen atoms; and, an organic component comprising a six member ring having at least five carbon atoms, and wherein the sixth member of the six member ring is either C or N, and wherein at least two substituent groups for the six member ring are each independently selected from hydroxyl, amino, amides, carbonyl, carboxyl, thiol, sulfonate, and pyridine, or form a fused ring provided that if one substituent group is a pyridine ring, the other substituent group is an alkyl group. An embodiment of the invention is one, any or all of prior embodiments in this paragraph up through the first embodiment in this paragraph, wherein the sixth member of the six member ring of the organic component is C and wherein the at least two substituent groups form a six member fused ring. An embodiment of the invention is one, any or all of prior embodiments in this paragraph up through the first embodiment in this paragraph, wherein the sixth member of the six member ring of the organic component is C and wherein the at least two substituent groups form a five member fused ring. An embodiment of the invention is one, any or all of prior embodiments in this paragraph up through the first embodiment in this paragraph, wherein the five member fused ring includes N and wherein a third substituent group of the six member ring of the organic component comprises sulfonate. An embodiment of the invention is one, any or all of prior embodiments in this paragraph up through the first embodiment in this paragraph, wherein the sixth member of the six member ring of the organic component is N. An embodiment of the invention is one, any or all of prior embodiments in this paragraph up through the first embodiment in this paragraph, wherein a first of the at least two substituent groups is pyridine and wherein the second of the at least two substituent groups is bonded to the N in the six member ring of the organic component. An embodiment of the invention is one, any or all of prior embodiments in this paragraph up through the first embodiment in this paragraph, wherein the sixth member of the six member ring of the organic component is C and wherein the six member ring includes at least one hydroxyl group. An embodiment of the invention is one, any or all of prior embodiments in this paragraph up through the first embodiment in this paragraph, wherein the six member ring includes at least two hydroxyl groups. An embodiment of the invention is one, any or all of prior embodiments in this paragraph up through the first embodiment in this paragraph, wherein the six member ring includes at least one amine group. An embodiment of the invention is one, any or all of prior embodiments in this paragraph up through the first embodiment in this paragraph, wherein the six member ring includes at least one thiol group. An embodiment of the invention is one, any or all of prior embodiments in this paragraph up through the first embodiment in this paragraph, wherein the sixth member of the six member ring of the organic component is C and wherein the six member ring includes at least two amine groups. An embodiment of the invention is one, any or all of prior embodiments in this paragraph up through the first embodiment in this paragraph, wherein the sixth member of the six member ring of the organic component is C and wherein the six member ring includes at least three hydroxyl groups. An embodiment of the invention is one, any or all of prior embodiments in this paragraph up through the first embodiment in this paragraph, wherein a fourth substituent group of the sixth member ring comprises a carboxyl group. An embodiment of the invention is one, any or all of prior embodiments in this paragraph up through the first embodiment in this paragraph, wherein a fourth substituent group comprises an ester group. An embodiment of the invention is one, any or all of prior embodiments in this paragraph up through the first embodiment in this paragraph, wherein at least one additional substituent group on the six member ring of the organic component comprises a halogen. An embodiment of the invention is one, any or all of prior embodiments in this paragraph up through the first embodiment in this paragraph, wherein the at least two substituent groups are hydroxyl groups. An embodiment of the invention is one, any or all of prior embodiments in this paragraph up through the first embodiment in this paragraph, wherein at least three substituent groups on the six member ring of the organic component are hydroxyl groups. An embodiment of the invention is one, any or all of prior embodiments in this paragraph up through the first embodiment in this paragraph wherein the catalytic composition is liquid. An embodiment of the invention is one, any or all of prior embodiments in this paragraph up through the first embodiment in this paragraph wherein the metal component comprises a metal bonded to at least four nitrogen atoms. An embodiment of the invention is one, any or all of prior embodiments in this paragraph up through the first embodiment in this paragraph wherein the metal is cobalt.

A second embodiment of the invention is a catalytic composition comprising a metal component comprising a metal bonded to at least two nitrogen atoms, wherein the metal component comprises at least one of cobalt phthalocyanine, cobalt phthalocyanine disulfonate, cobalt phthalocyanine sulfonamide, B12 vitamer, cobalamin, cobalt porphyrins, cobalt porphines, and cobalt tetra-aza macrocycles; and, an organic component comprising a six member ring having at least five carbon atoms, wherein the organic component comprises at least one of a bipyridinium core structure, a viologen core structure, a benzene with two or more amine groups, a benzene with two or more hydroxyl groups, a benzene with two or more sulfonane groups, a indigo core structure, indigo carmine, benezenetriol, a benzenetriol substituted with a sulfate, an ester, ether or carboxyl, phenolic acids, diphenolic acids, trihydroxyl phenolic acids, and substituted phenolic acids.

A third embodiment of the invention is a process for removing mercaptans from a hydrocarbon stream comprising extracting mercaptans from a hydrocarbon stream in an extraction zone with a caustic stream to provide a rich caustic stream and, oxidizing the mercaptans in the rich caustic stream with an oxidation gas, in the presence of a catalyst, to produce disulfides, wherein the catalyst comprises a metal component comprising a metal bonded to at least two nitrogen atoms, and an organic component comprising a six member ring having at least five carbon atoms, wherein the sixth member of the six member ring is either C or N, and wherein at least two substituent groups for the six member ring are each independently selected from hydroxyl, amino, amides, carbonyl, carboxyl, thiol, sulfonate, and pyridine, or form a fused ring provided that if one substituent group is a pyridine ring, the other substituent group is an alkyl group. An embodiment of the invention is one, any or all of prior embodiments in this paragraph up through the first embodiment in this paragraph further comprising passing the catalyst and the rich caustic stream to an oxidation zone, the oxidation zone providing an oxidized effluent, wherein the oxidation zone receives the oxidation gas. An embodiment of the invention is one, any or all of prior embodiments in this paragraph up through the first embodiment in this paragraph wherein the oxidation gas is passed to the oxidation zone along with the catalyst, the rich caustic stream, or both. An embodiment of the invention is one, any or all of prior embodiments in this paragraph up through the first embodiment in this paragraph further comprising separating the oxidized effluent into at least a lean caustic stream and a liquid disulfide phase. An embodiment of the invention is one, any or all of prior embodiments in this paragraph up through the first embodiment in this paragraph further comprising recycling the lean caustic stream to the extraction zone as the caustic stream. An embodiment of the invention is one, any or all of prior embodiments in this paragraph up through the first embodiment in this paragraph wherein a molar ratio of metal component to organic component is between 100:1 to 10:90. An embodiment of the invention is one, any or all of prior embodiments in this paragraph up through the first embodiment in this paragraph wherein a weight ratio of metal component to organic component is approximately 1:1. An embodiment of the invention is one, any or all of prior embodiments in this paragraph up through the first embodiment in this paragraph wherein the metal component comprises at least one of cobalt phthalocyanine, cobalt phthalocyanine disulfonate, cobalt phthalocyanine sulfonamide, B12 vitamer, cobalamin, cobalt porphyrins, cobalt porphines, and cobalt tetra-aza macrocycles. An embodiment of the invention is one, any or all of prior embodiments in this paragraph up through the first embodiment in this paragraph wherein the organic component comprises comprise least one of a bipyridinium core structure, a viologen core structure, a benzene with two or more amine groups, a benzene with two or more hydroxyl groups, a benzene with two or more sulfonane groups, a indigo core structure, indigo carmine, benezenetriol, a benzenetriol substituted with a sulfate, an ester, ether or carboxyl, phenolic acids, diphenolic acids, trihydroxyl phenolic acids, and substituted phenolic acids. An embodiment of the invention is one, any or all of prior embodiments in this paragraph up through the first embodiment in this paragraph wherein the organic component is halogenated. An embodiment of the invention is one, any or all of prior embodiments in this paragraph up through the first embodiment in this paragraph wherein the organic component comprises 1,2,4-benzenetriol. An embodiment of the invention is one, any or all of prior embodiments in this paragraph up through the first embodiment in this paragraph wherein the sixth member of the six member ring of the organic component is C and wherein the at least two substituent groups form a six member fused ring. An embodiment of the invention is one, any or all of prior embodiments in this paragraph up through the first embodiment in this paragraph, wherein the sixth member of the six member ring of the organic component is C and wherein the at least two substituent groups form a five member fused ring. An embodiment of the invention is one, any or all of prior embodiments in this paragraph up through the first embodiment in this paragraph, wherein the five member fused ring includes N and wherein a third substituent group of the six member ring of the organic component comprises sulfonate. An embodiment of the invention is one, any or all of prior embodiments in this paragraph up through the first embodiment in this paragraph, wherein the sixth member of the six member ring of the organic component is N. An embodiment of the invention is one, any or all of prior embodiments in this paragraph up through the first embodiment in this paragraph, wherein a first of the at least two substituent groups is pyridine and wherein the second of the at least two substituent groups is bonded to the N in the six member ring of the organic component. An embodiment of the invention is one, any or all of prior embodiments in this paragraph up through the first embodiment in this paragraph, wherein the sixth member of the six member ring of the organic component is C and wherein the six member ring includes at least one hydroxyl group. An embodiment of the invention is one, any or all of prior embodiments in this paragraph up through the first embodiment in this paragraph, wherein the six member ring includes at least one additional hydroxyl group, at least one amine group, at least one thiol group, or a combination thereof.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A catalytic composition comprising:
a metal component comprising a metal bonded to at least two nitrogen atoms; and,
an organic component comprising a six member ring having at least five carbon atoms, and wherein the sixth member of the six member ring is C, and
wherein at least two substituent groups of the six member ring form a six member fused ring or a five member fused ring.

2. The catalytic composition of claim 1, wherein the five member fused ring includes N and wherein a third substituent group of the six member ring of the organic component comprises sulfonate.

3. A catalytic composition comprising:
a metal component comprising a metal bonded to at least two nitrogen atoms; and,
an organic component comprising a six member ring having at least five carbon atoms, and wherein the sixth member of the six member ring is N, and
wherein at least two substituent groups of the six member ring are each independently selected from hydroxyl, amino, amides, carbonyl, carboxyl, thiol, sulfonate, and pyridine, or form a fused ring, provided that if one substituent group is a pyridine ring, the other substituent group is an alkyl group, and wherein a first of the at least two substituent groups is pyridine and wherein the second of the at least two substituent groups is bonded to the N in the six member ring of the organic component.

4. A catalytic composition comprising:
a metal component comprising a metal bonded to at least two nitrogen atoms; and,
an organic component comprising a six member ring having at least five carbon atoms, and wherein the sixth member of the six member ring is C, and wherein the six member ring includes at least two substituent groups independently selected from:
at least one hydroxyl group and at least one amine group,
at least one hydroxyl group and at least one thiol group,
at least two hydroxyl groups and a halogen, and
at least three hydroxyl groups and a halogen.

5. A catalytic composition comprising:
a metal component comprising a metal bonded to at least two nitrogen atoms; and,
an organic component comprising a six member ring having at least five carbon atoms, and wherein the sixth member of the six member ring of the organic component is C and wherein the six member ring includes at least three hydroxyl groups.

6. The catalytic composition of claim 5, wherein a fourth substituent group of the six member ring comprises a carboxyl group.

7. The catalytic composition of claim 5, wherein a fourth substituent group of the six member ring comprises an ester group.

8. The catalytic composition of claim 5 wherein the metal component comprises a metal bonded to at least four nitrogen atoms.

9. The catalytic composition of claim 5 wherein the metal is cobalt.

10. A catalytic composition comprising:
a metal component comprising at least one of cobalt phthalocyanine, cobalt phthalocyanine disulfonate, cobalt phthalocyanine sulfonamide, B 12 vitamer, cobalamin, cobalt porphyrins, cobalt porphines, and cobalt tetra-aza macrocycles; and,
an organic component comprising
at least one of a bipyridinium core structure, a viologen core structure, a benzene with three or more hydroxyl groups, a benzene with two or more sulfonane groups, a indigo core structure, indigo carmine, benezenetriol, a benzenetriol substituted with a sulfate, an ester, ether or carboxyl, phenolic acids, diphenolic acids, trihydroxyl phenolic acids, and substituted phenolic acids.

11. A process for removing mercaptans from a hydrocarbon stream comprising: extracting mercaptans from a hydrocarbon stream in an extraction zone with a caustic stream to provide a rich caustic stream; and,
oxidizing the mercaptans in the rich caustic stream with an oxidation gas, in the presence of a catalyst, to produce disulfides, wherein the catalyst comprises a metal component comprising a metal bonded to at least two nitrogen atoms, and
an organic component comprising a six member ring having at least five carbon atoms, wherein the sixth member of the six member ring is C, and
wherein at least three substituent groups of the six member ring are hydroxyl groups.

* * * * *